UNITED STATES PATENT OFFICE 1,920,585

CONDENSATION PRODUCT OF ALKALI METAL BISULPHITES WITH OCTADECADIENE -9, 11-ACID-1 OR ITS AMIDE

Karl Ott, Leverkusen, and Heribert Schüssler, Cologne-Deutz, Germany, assignors, by mesne assignments, to General Aniline Works, Inc., New York, N. Y.

No Drawing. Application January 29, 1931, Serial No. 512,202, and in Germany February 10, 1930

2 Claims. (Cl. 260—112)

The present invention relates to new wetting and emulsifying agents which are chemically condensation products from sulphurous acid salts and octadecadiene -9, 11-acid-1 or its amide containing a conjugated double bond. These condensation products are obtainable by causing octadecadiene -9, 11-acid-1 to react with sulphurous acid salts. In the literature, for example, in Scheiber, Holzöl and Holzölersatz in Farbe und Lack 1929, page 154, the octadecadiene -9, 11-acid-1 is described as $C_{18}H_{32}O_2$ of the formula:

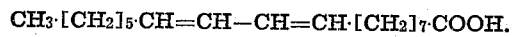

It is obtainable by the splitting off of water from ricinoleic acid $C_{18}H_{34}O_3$ of the formula:

By this splitting off of water the conjugated double bond is formed. It is not necessary to start from the pure acid, but the product obtained from castor oil by splitting off water can be applied directly or after saponification.

The process itself can be carried out with sulphurous acid salts in the most varied manners. Furthermore, if desired or required emulsifying agents may be added to the reaction mixture for the purpose of facilitating the initial reaction.

The products of the reaction which chemically probably are sulfonic acids, are not decomposed by aqueous solutions of strong acids. They are distinguished by a pronounced wetting and emulsifying power. They are stable to boiling with dilute mineral acids, while in the case of the known Turkey red oils a splitting off of the sulfuric acid residue occurs. As contrasted with the Turkey red oils obtainable by known processes the condensation products used according to this invention are distinguished by a considerably increased wetting and emulsifying capacity.

The following example will illustrate the invention but without restricting it thereto:

Example 280 parts by weight of octadecadiene -9, 11-acid-1 are dissolved in hot water with the addition of 40 parts by weight of caustic soda, 150 parts by weight of 100% sodium bisulphite (in the form of 38° Bé. sulphite liquor) are added and the whole is heated to 40–100° C. with very good mechanical stirring until a test portion after dilution with water and acidification no longer shows an oily layer.

The reaction product can be separated from the reaction mass by means of sodium chloride as a light colored clear oil, which dissolves in water and displays a pronounced wetting and emulsifying power.

In the same manner the amide of octadecadiene -9, 11-acid-1 can also be treated with sodium bisulphite. A light colored clear oil of almost the same qualities is thus obtained.

The new wetting and emulsifying agents are used as follows:

2 to 5 per cent of the condensation product from sodium bisulphite and octadecadiene -9, 11-acid-1 is added to a water bath.

Then any article, for instance, from cotton is introduced into this bath. A wetting or emulsifying effect immediately follows.

We claim:

1. New wetting and emulsifying agents being chemically condensation products from alkali metal bisulphites and a member of the group consisting of octadecadiene -9, 11-acid-1 and its amides.

2. As a new wetting and emulsifying agent the condensation product from sodium bisulphite and octadecadiene -9, 11-acid-1.

KARL OTT.
HERIBERT SCHÜSSLER.